United States Patent
Duncan et al.

(10) Patent No.: US 9,186,939 B2
(45) Date of Patent: Nov. 17, 2015

(54) TIRE ROTATION DEVICE

(71) Applicant: Bridgestone Americas Tire Operations, LLC, Nashville, TN (US)

(72) Inventors: Anthony Bruce Duncan, Wadsworth, OH (US); Timothy John Heppe, Columbiana, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 260 days.

(21) Appl. No.: 13/861,833

(22) Filed: Apr. 12, 2013

(65) Prior Publication Data

US 2014/0306390 A1    Oct. 16, 2014

(51) Int. Cl.
*B60B 29/00*    (2006.01)
*B60C 25/00*    (2006.01)

(52) U.S. Cl.
CPC ............... *B60C 25/007* (2013.04); *B60B 29/00* (2013.01); *B60B 29/001* (2013.01)

(58) Field of Classification Search
CPC ...... B60B 29/00; B60B 29/001; B60B 30/00; B60B 30/02; B60B 30/06; B60B 30/08; B60B 30/10; B60C 25/04; B60C 25/05; B60C 25/0503; B60C 25/0521; B60C 25/0545
See application file for complete search history.

(56) References Cited

U.S. PATENT DOCUMENTS

| | | | |
|---|---|---|---|
| 978,976 A * | 12/1910 | Wolff, Jr. | 157/18 |
| 1,621,650 A * | 3/1927 | Angel | 294/67.22 |
| 1,779,907 A | 10/1930 | Dye | |
| 2,445,731 A | 7/1948 | Jaycox | |
| 2,647,007 A * | 7/1953 | Gmoser et al. | 294/104 |
| 2,744,780 A * | 5/1956 | Dixon | 294/103.2 |
| 3,491,427 A * | 1/1970 | Zimmerman et al. | 29/240 |
| 4,022,341 A * | 5/1977 | Lindquist | 414/426 |
| 4,600,354 A | 7/1986 | Niewald et al. | |
| 4,684,310 A * | 8/1987 | Stange | 414/427 |
| 5,344,207 A | 9/1994 | Grimm | |
| 5,915,500 A | 6/1999 | Weaver | |
| 6,269,689 B1 | 8/2001 | Alexander | |
| 6,673,182 B1 * | 1/2004 | Merendino, Sr. | 156/110.1 |
| 7,740,439 B1 | 6/2010 | Browning et al. | |
| 2003/0025347 A1* | 2/2003 | Shwaykowski | 294/104 |
| 2005/0056818 A1* | 3/2005 | Harrah | 254/133 R |
| 2009/0311082 A1 | 12/2009 | Glass | |
| 2009/0315353 A1* | 12/2009 | Bierman | 294/106 |
| 2010/0051390 A1 | 3/2010 | Buzzi | |
| 2013/0264835 A1* | 10/2013 | LeBlanc | 294/67.2 |

FOREIGN PATENT DOCUMENTS

FR    2553718 A1 *    4/1985    ............. B60B 29/00

* cited by examiner

*Primary Examiner* — Lee D Wilson
*Assistant Examiner* — Tyrone V Hall, Jr.

(57) ABSTRACT

A tire rotation device includes a mounting member having at least one aperture configured to receive at least one lifting member. The tire rotation device further includes a rotating member configured to receive a tire.

20 Claims, 4 Drawing Sheets

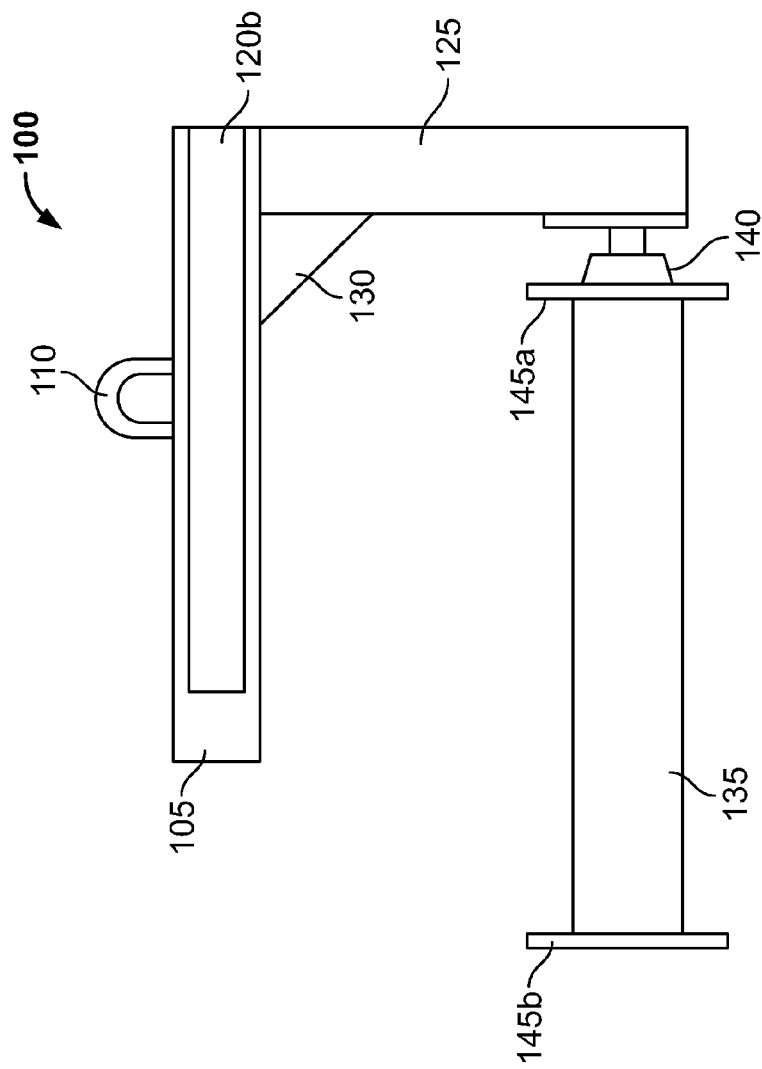
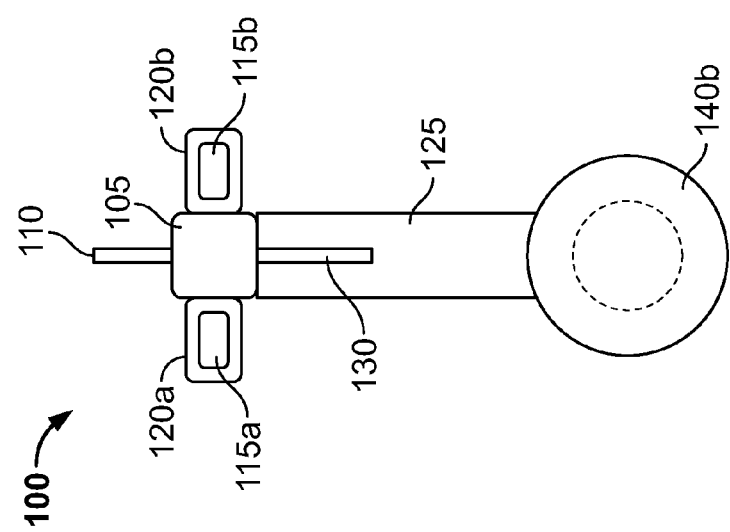
FIG. 2
FIG. 1

TIRE ROTATION DEVICE

FIELD OF INVENTION

The present disclosure relates to the field of tire inspection. More particularly, the present disclosure relates to a rotation device for tire inspection.

BACKGROUND

In research and development or testing facilities, tires are tested for wear and other properties, and then inspected after testing. Additionally, tires are inspected at production plants, warehouses, retail facilities, and maintenance facilities. Such inspections may be formal and informal. Tires may be inspected on a floor surface, and rolled along the floor to inspect different parts of the tire. Alternatively, a tire may be lifted by a forklift, crane, or other lifting device to provide more convenient access to the tire. Such lifting devices do not allow for rotation of the tire.

SUMMARY OF THE INVENTION

In one embodiment, a tire rotation device includes a mounting member having a loop configured to receive a hook, and a pair of apertures configured to receive a pair of lifting arms. The tire rotation device also includes a connecting member connected to the mounting member, and a rotating spindle rotatably connected to the connecting member. The rotating spindle is configured to receive a tire.

In another embodiment, an assembly includes a tire rotation device with a first member having at least one aperture configured to receive at least one lifting member. The tire rotation device also has a second member configured to receive a tire. The second member is configured to rotate. The assembly further includes a frame having an elongated surface configured to receive the first member, and at least a pair of legs extending downward from the elongated surface.

In yet another embodiment, a tire rotation device includes a mounting member having at least one aperture configured to receive at least one lifting member. The tire rotation device further includes a rotating member configured to receive a tire.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

FIG. 1 is a front view of one embodiment of a tire rotation device;

FIG. 2 is a side view of the tire rotation device;

DETAILED DESCRIPTION

Figure 4:
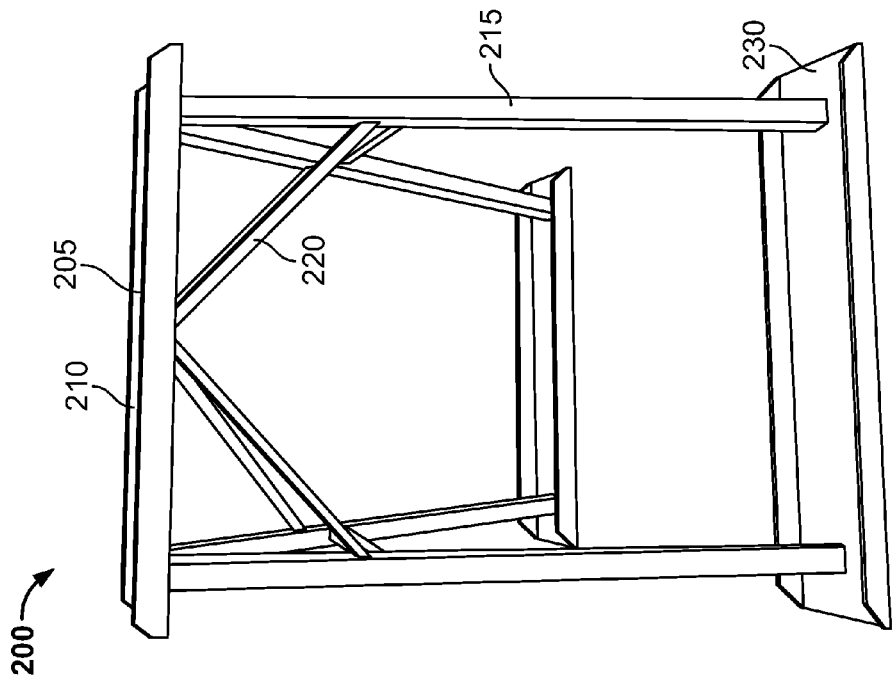
FIG. 4 is a side view of the tire rotation device stand.

FIGS. 1 and 2 are front and side views, respectively, of one embodiment of a tire rotation device 100. FIG. 2 is a side view of the tire rotation device 100. The tire rotation device 100 will be described with reference to both FIGS. 1 and 2.

The tire rotation device 100 includes a mounting member 105 having a loop 110 configured to receive a hook (not shown), such as a hook from a crane or other lifting mechanism. The loop 110 extends in the fore-aft direction of the tire rotation device 100 such that an aperture is visible from the side of the device. However, it should be understood that the loop 110 may extend in any direction.

In the illustrated embodiment, the loop 110 is a separate component connected to a top surface of the mounting member 105. In an alternative embodiment (not shown) the loop is integral with the mounting member. In another alternative embodiment (not shown), the loop is omitted. However, it should be understood that any aperture may be employed for receiving a hook or other lifting mechanism.

The mounting member 105 further includes a pair of apertures 115a,b configured to receive a pair of lifting arms. The apertures 115a,b are spaced to receive the lifting arms of a forklift or similar lifting arms on a front end loader or other lifting device. In the illustrated embodiment, a first aperture 115a is formed by a first tube 120a connected to a first side of the mounting member 105, and a second aperture 115b is formed by a second tube 120b connected to a second side of the mounting member 105 opposite the first side. In an alternative embodiment (not shown), the pair of apertures may be formed in tubes connected to the top of the mounting member. In another alternative embodiment (not shown), the pair of apertures may be formed directly in the mounting member. In yet another alternative embodiment (not shown), the pair of apertures may be omitted.

A connecting member 125 is connected to a first end of the mounting member 105. In the illustrated embodiment, the connecting member 125 is a rigid member, and a support member 130 is disposed between the mounting member 105 and the connecting member 125. The support member 130 is a triangular component having a first portion connected to the mounting member 105 and a second portion connected to the connecting member 125. In alternative embodiments (not shown), the support member may have any geometric shape. For example, the support member may be a beam. In another alternative embodiment (not shown), the support member may be omitted.

The tire rotation device 100 further includes a rotating spindle 135 rotatably connected to the connecting member 125. In the illustrated embodiment, the rotating spindle 135 is a cantilevered spindle having a first end rotatably connected to the connecting member 125 through a bearing 140.

The rotating spindle 135 has a cylindrical shape and is configured to receive a tire (not shown). A first circular plate 145a is connected to a first end of the rotating spindle 135 and a second circular plate 145b is connected to a second end of the rotating spindle 135. Each of the first and second plates 145a,b have a larger diameter than the diameter of the rotating spindle 135 to prevent a tire from sliding off. Although the first and second plates 145a,b are shown as circular, it should be understood that they may have any geometric shape.

In operation, the tire rotation device 100 is lifted via a hook engaging the loop 100 or lifting arms engaging the first and second tubes 120a,b. The rotating spindle 135 is then inserted through a central aperture of a tire and the tire rotation device 100 may be further lifted to a desired height. Alternatively, the tire rotation device 100 may first be lifted to a desired height, before a tire is placed on the rotating spindle 135.

After the rotation device 100 and tire have been brought to a desired height, an inspector may then inspect the tire. The inspector may be a human performing a visual inspection, or an inspection employing tools such as mechanical, electrical, and/or optical tools. Alternatively, the inspector may be a robot or other mechanized apparatus performing an automated inspection.

During inspection, the tire may be rotated by hand or by mechanized means. The rotating spindle 135 facilitates such rotation. While the tire rotation device 100 may be employed with any tire, it may be particularly useful for the inspection of large tires, such as agricultural tires for tractors, which would otherwise prove difficult to inspect and rotate by hand.

In one embodiment, the tire rotation device 100 is constructed of mild steel. Alternatively, the tire rotation device may be constructed of other grades of steel, or other metals such as brass. The tire rotation device may also be constructed of fiber glass or a polymeric material. However, it should be understood that the invention is not limited to any particular materials.

In one particular embodiment, the mounting member 105 and the connecting member 125 are each constructed of 6 inch by 6 inch by 0.5 inch wall square steel tubing. The mounting member 105 has a length of 48 inches and the connecting member 125 has a height of 38 inches. In this embodiment, the first and second tubes 120a,b are constructed of 6 inch by 3 inch by 0.5 inch wall square steel tubing, with each have a length of 42 inches. The loop 110 is positioned near the center of gravity of the tire rotation device 100, about 21 inches from the first end of the mounting member 105. The rotating spindle 135 is constructed of a 6 inch diameter, 0.25 inch wall round steel tubing and has a length of 48 inches. The plates 145a,b are 0.5 inches thick and have a diameter of 14 inches. It should be understood that the above listed dimensions are merely exemplary, and do not limit the claimed invention. In alternative embodiments, other dimensions may be used.

Figure 3:
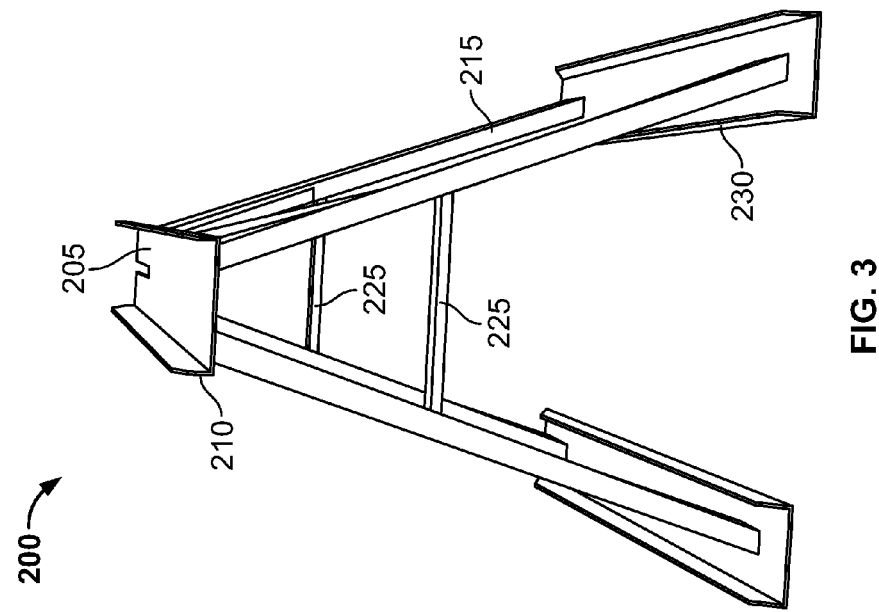
FIG. 3 is a front view of one embodiment of a tire rotation device stand.
Figure 6:
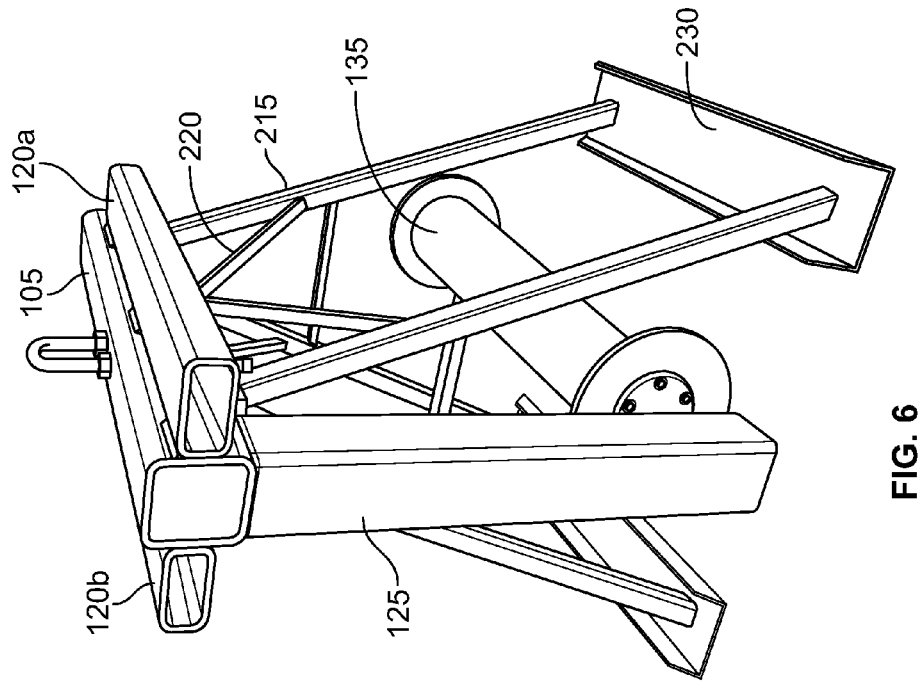
FIG. 6 is a side view of one embodiment of the tire rotation device and stand assembly.
Figure 5:
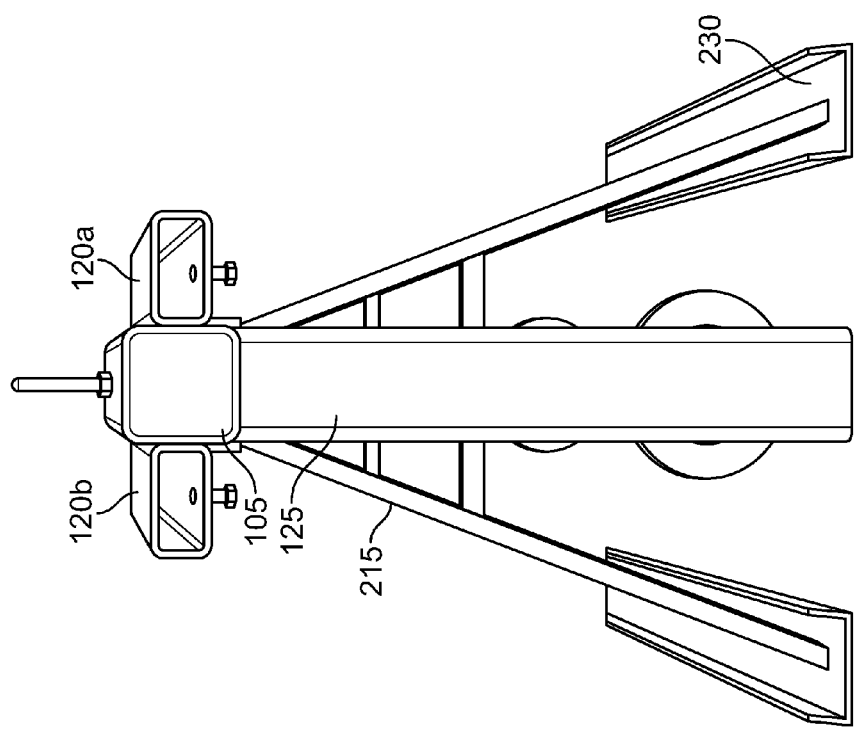
FIG. 5 is a front view of one embodiment of a tire rotation device and stand assembly.

FIGS. 3 and 4 are front and side views, respectively, of one embodiment of a tire rotation device stand 200. FIGS. 5 and 6 are front and side views, respectively, of one embodiment of the tire rotation device 100 on the tire rotation device stand 200. The tire rotation device stand 200 will be described with reference to each of FIGS. 3-6.

The tire rotation device stand 200 includes an elongated surface 205 configured to receive the mounting member 105 of the tire rotation device 100. In the illustrated embodiment, the elongated surface 205 includes raised edges 210 to aid in seating the tire rotation device 100. In alternative embodiments (not shown), the raised edges may be omitted.

The tire rotation device stand 200 further includes a plurality of legs 215 extending downward from the elongated surface. In the illustrated embodiment, the tire rotation device stand 200 includes four legs 215, with each leg disposed at an obtuse angle with respect to the elongated surface 205. In other words, the legs 215 are in an A-shaped configuration. In alternative embodiments (not shown), the stand may include two legs, or any number of legs.

A plurality of support members 220 extend from the elongated surface 205 to the legs 215. In the illustrated embodiment, four support members 220 are employed. It should be understood, however, that any number of support members may be used. In an alternative embodiment (not shown), the support members may be omitted.

Additionally, a pair of crossbeams 225 extend substantially orthogonal to the elongated surface 205, connecting pairs of oppositely disposed legs 215. In an alternative embodiment (not shown), the crossbeams are omitted.

In the illustrated embodiment, the tire rotation device stand 200 further includes a pair of elongated feet 230. Each elongated foot is connected to two of the legs 215. In an alternative embodiment (not shown), each leg has a foot. In another alternative embodiment (not shown), the feet are omitted.

The tire rotation device stand 200 may be used to house the tire rotation device 100 when the device is not in use. In the illustrated embodiment, when the tire rotation device 100 is placed on the elongated surface 205 of the tire rotation device stand 200, the legs 215 do not provide adequate clearance for the rotating spindle 135 to receive a tire. However, in alternative embodiments (not shown), the tire rotation device stand may be dimensioned to allow the tire rotation device to receive a tire when the tire rotation device stand is placed on the elongated surface.

In one embodiment, the tire rotation device stand 200 is constructed of mild steel. Alternatively, the tire rotation device stand may be constructed of other grades of steel, or other metals such as brass. The tire rotation device stand may also be constructed of fiber glass or a polymeric material. However, it should be understood that the invention is not limited to any particular materials. The tire rotation device and the tire rotation device stand may be constructed of the same or different material.

Figure 7:
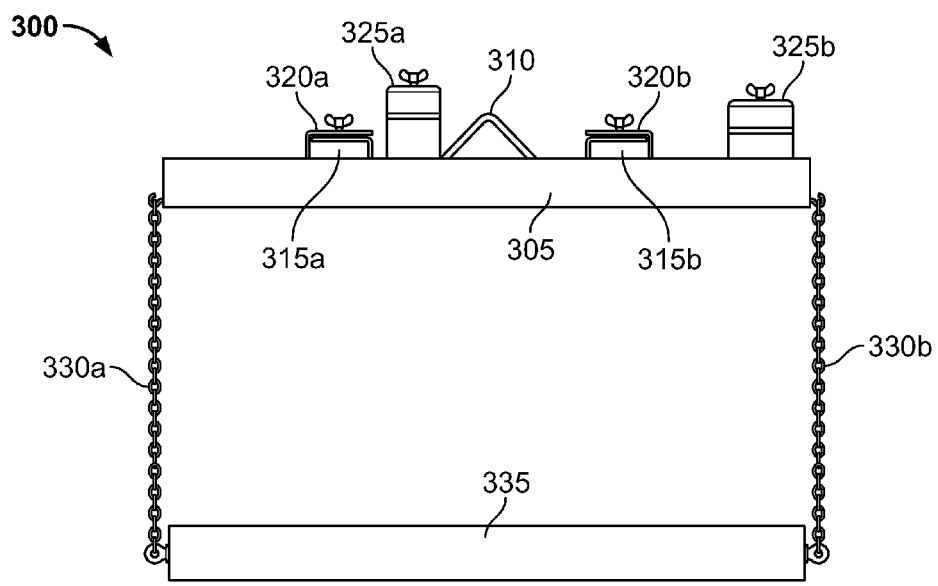
FIG. 7 is a side view of an alternative embodiment of a tire rotation device.

FIG. 7 is a side view of an alternative embodiment of a tire rotation device 300. The tire rotation device 300 includes a mounting member 305 having a loop 310 configured to receive a hook (not shown), such as a hook from a crane or other lifting mechanism. The loop 310 extends in the fore-aft direction of the tire rotation device 300 such that an aperture is visible from the side of the device. However, it should be understood that the loop 310 may extend in any direction.

In the illustrated embodiment, the loop 310 is a separate component connected to a top surface of the mounting member 305. In an alternative embodiment (not shown) the loop is integral with the mounting member. In another alternative embodiment (not shown), the loop is omitted. However, it should be understood that any aperture may be employed for receiving a hook or other lifting mechanism.

The mounting member 305 further includes a pair of apertures 315a,b configured to receive a pair of lifting arms. The apertures 315a,b are spaced to receive the lifting arms of a forklift or similar lifting arms on a front end loader or other such lifting device. In the illustrated embodiment, a first aperture 315a is formed by a first tube 320a connected to the top of the mounting member 305, and a second aperture 315b is formed by a second tube 320b also connected to the top of the mounting member 305. In an alternative embodiment (not shown), the pair of apertures may be formed in tubes connected to the sides of the mounting member. In another alternative embodiment (not shown) the pair of apertures may be formed directly in the mounting member. In yet another alternative embodiment (not shown), the pair of apertures may be omitted.

In the illustrated embodiment, the tire rotation device 300 also includes a pair of alternate tubes 325a,b orthogonal to the first and second tubes 320a,b. The alternate tubes 325a,b are also configured to receive lifting arms, and may be used when it is desired to lift the tire rotation device 300 in a different orientation. In an alternative embodiment (not shown), the alternate tubes may be omitted.

A pair of connecting members 330a,b are connected to first and second ends of the mounting member 305. In the illustrated embodiment, the connecting members 330a,b are chains. In an alternative embodiment (not shown), the connecting members may be rigid members.

The tire rotation device 300 further includes a rotating spindle 335 rotatably connected to the connecting members 330a,b. The rotating spindle 335 has a first end rotatably connected to the first connecting member 330a, and a second end connected to the second connecting member 330b.

Figure 8:
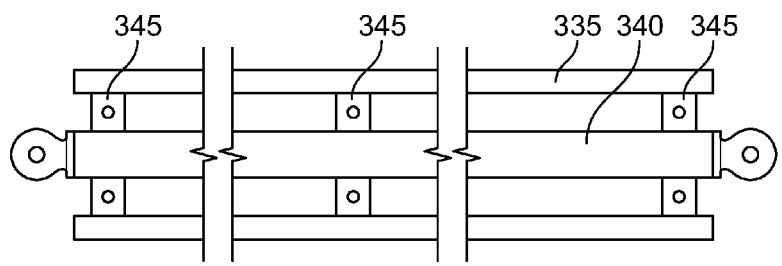
FIG. 8 is a cross section of a first embodiment of a rotating spindle in the alternative embodiment of the tire rotation device.

FIG. 8 is a cross section of a first embodiment of the rotating spindle 335. In this embodiment, the rotating spindle is a cylinder and is disposed about an internal bar 340. Bearings 345 are disposed about the internal bar 340, thereby facilitating rotation of the cylinder 335 about the internal bar 340.

Figure 9:
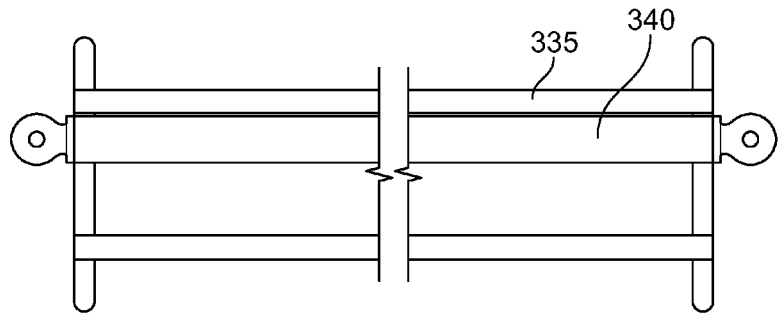
FIG. 9 is a cross section of a second embodiment of a rotating spindle in the alternative embodiment of the tire rotation device.

FIG. 9 is a cross section of a second embodiment of the rotating spindle 335. In this embodiment, the rotating spindle is still a cylinder disposed about the internal bar 340. However, the bearings are omitted so that the cylinder 335 contacts the internal bar 340. The cylinder 335 still rotates about the internal bar, although the force of friction may be greater without the bearings.

The tire rotation device 300 may be used in a similar manner as the tire rotation device 100 described above, except one of the connecting members 330a,b must be disconnected from the rotating spindle 335 to allow the rotating spindle 335 to receive a tire. After the tire has been received, the connecting member 330 is reconnected to the rotating spindle 335 so that the rotating spindle 335 may support the tire and rotate.

In one embodiment, the tire rotation device 300 is constructed of mild steel. Alternatively, the tire rotation device may be constructed of other grades of steel, or other metals such as brass. The tire rotation device may also be constructed of fiber glass or a polymeric material. However, it should be understood that the invention is not limited to any particular materials.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A tire rotation device comprising:
   a mounting member including a loop configured to receive a hook and a pair of apertures configured to receive a pair of lifting arms;
   a connecting member connected to the mounting member; and
   a rotating spindle rotatably connected to the connecting member, the rotating spindle being configured to receive a tire.

2. The tire rotation device of claim 1, wherein the loop is a separate component connected to a top surface of the mounting member.

3. The tire rotation device of claim 1, wherein a first of the pair of apertures is disposed in a first tube connected to a first side of the mounting member, and wherein a second of the pair of apertures is disposed in a second tube connected to a second side of the mounting member opposite the first side.

4. The tire rotation device of claim 1, wherein the connecting member is a rigid member, and the rotating spindle is a cantilevered spindle having a first end rotatably connected to the connecting member through a bearing.

5. The tire rotation device of claim 4, further comprising a support member having a first portion connected to the mounting member and a second portion connected to the connecting member.

6. The tire rotation device of claim 1, wherein the connecting member includes a first chain that connects a first end of the mounting member to a first end of the rotating spindle, and a second chain that connects a second end of the mounting member to a second end of the rotating spindle.

7. The tire rotation device of claim 1, wherein the rotating spindle has a cylindrical shape, wherein a first circular plate is connected to a first end of the rotating spindle and a second circular plate is connected to a second end of the rotating spindle, and wherein each of the first and second plates have a larger diameter than the diameter of the rotating spindle.

8. The tire rotation device of claim 1, further comprising a frame configured to receive the mounting member.

9. The tire rotation device of claim 8, wherein the frame includes an elongated surface configured to receive the mounting member, and at least a pair of legs extending downward from the elongated surface.

10. An assembly comprising:
    a tire rotation device including:
       a first member having at least one aperture configured to receive at least one lifting member,
       a second member configured to receive a tire, wherein the second member is configured to rotate,
       wherein the first member is located above the second member; and
    a frame including:
       an elongated surface configured to receive the first member, and
       at least a pair of legs extending downward from the elongated surface.

11. The assembly of claim 10, wherein the at least one aperture of the first member is formed by a loop configured to receive a hook.

12. The assembly of claim 10, wherein the at least one aperture of the first member includes a pair of apertures configured to receive arms of a forklift.

13. The assembly of claim 10, wherein the tire rotation device further includes a rigid connecting member, wherein a first end of the first member is rigidly connected to the rigid connecting member, and wherein a first end of the second member is rotatably connected to the rigid connecting member.

14. The assembly of claim 10, wherein the tire rotation device further includes:
   a first connecting member connected to a first end of the first member and a first end of the second member, and
   a second connecting member connected to a second end of the first member and a second end of the second member.

15. The assembly of claim 14, wherein the second member of the tire rotation device includes a cylinder and an internal bar, wherein the cylinder is configured to rotate about the internal bar.

16. The assembly of claim 15, wherein the tire rotation device further includes a plurality of bearings disposed about the internal bar.

17. A tire rotation device comprising:
   a mounting member having at least one aperture configured to receive at least one lifting member; and
   a rotating member configured to receive a tire,
      wherein the rotating member is arranged below the mounting member.

18. The tire rotation device of claim 17, further comprising a connecting member connected to a first end of the mounting member and a first end of the rotating member.

19. The tire rotation device of claim 18, further comprising a second connecting member connected to a second end of the mounting member and second end of the rotating member.

20. The tire rotation device of claim 17, wherein the at least one aperture includes a pair of apertures configured to receive a pair of lifting arms, and a loop configured to receive a hook.

* * * * *